United States Patent [19]

Hellmer

[11] 4,359,314
[45] Nov. 16, 1982

[54] TRANSFER DEVICE FOR APPLYING LABELS TO BLOW MOLDS

[75] Inventor: Ernest W. Hellmer, Chicago, Ill.

[73] Assignee: The Continental Group, Inc., Stamford, Conn.

[21] Appl. No.: 192,394

[22] Filed: Sep. 30, 1980

[51] Int. Cl.³ .................... B29C 17/07; B65H 3/08; B65H 3/46

[52] U.S. Cl. .................... 425/503; 264/509; 271/103; 271/106; 271/107; 425/504; 425/522; 425/539

[58] Field of Search .......... 425/503, 522, 539, 504; 264/509; 271/103, 106, 107

[56] References Cited

U.S. PATENT DOCUMENTS

| | | | |
|---|---|---|---|
| 2,745,665 | 5/1956 | Labombarde | 271/106 X |
| 3,053,529 | 9/1962 | Dunn | 271/107 X |
| 3,176,978 | 4/1965 | Baker et al. | 271/107 X |
| 3,287,011 | 11/1966 | Currie, Jr. | 271/107 X |
| 3,292,209 | 12/1966 | Borkmann | 264/509 X |
| 3,324,508 | 6/1967 | Dickinson | 425/522 X |
| 3,797,822 | 3/1974 | Anderson | 271/107 X |

Primary Examiner—Jan H. Silbaugh
Attorney, Agent, or Firm—Charles E. Brown

[57] ABSTRACT

This relates to a transfer apparatus for transferring labels from a label stack into the cavity of a moving mold half. The transfer device includes a pivotally mounted arm which has mounted on its free end a transfer head which swings about the arm so that for a limited movement of the arm there can be a much greater movement of the transfer head. Thus, the transfer head may rapidly enter and rapidly depart from a mold cavity so that a label may be seated in the mold cavity very quickly without requiring any slowdown of the movement of the mold half. The transfer head is provided with vacuum heads which operate to effect a peeling of a label from its associated stack beginning along one edge portion of the label so as to assure that only a single label is picked up from the stack.

11 Claims, 8 Drawing Figures

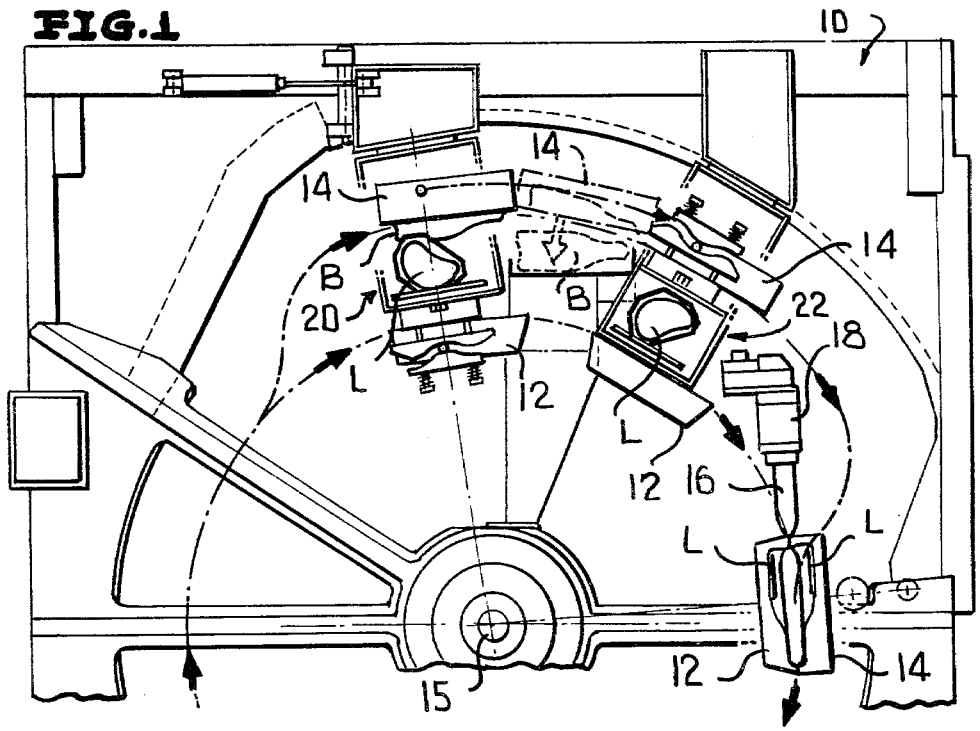
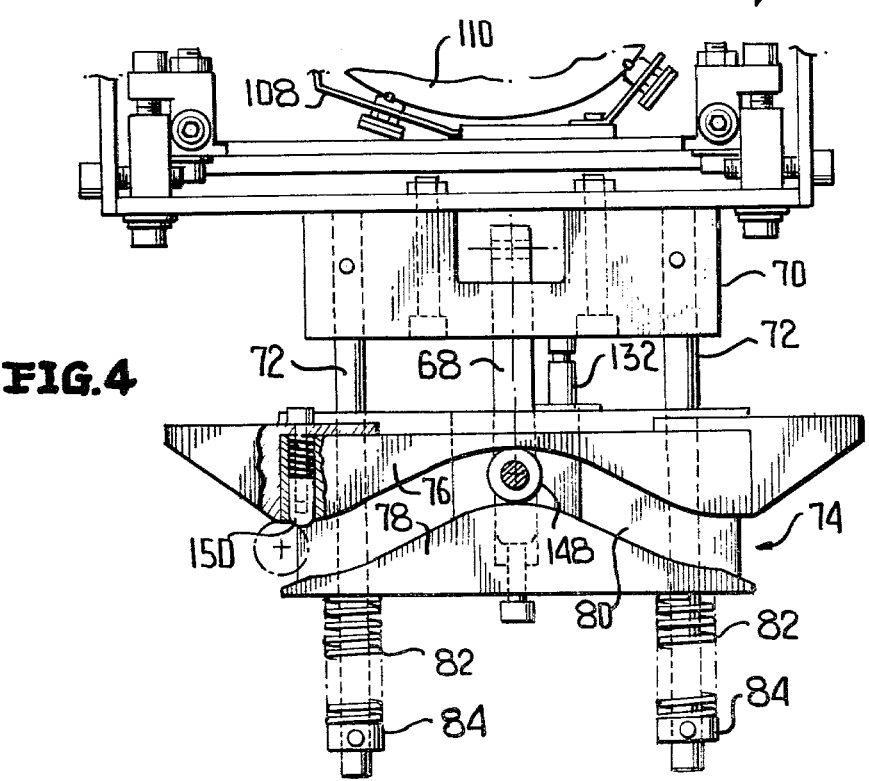

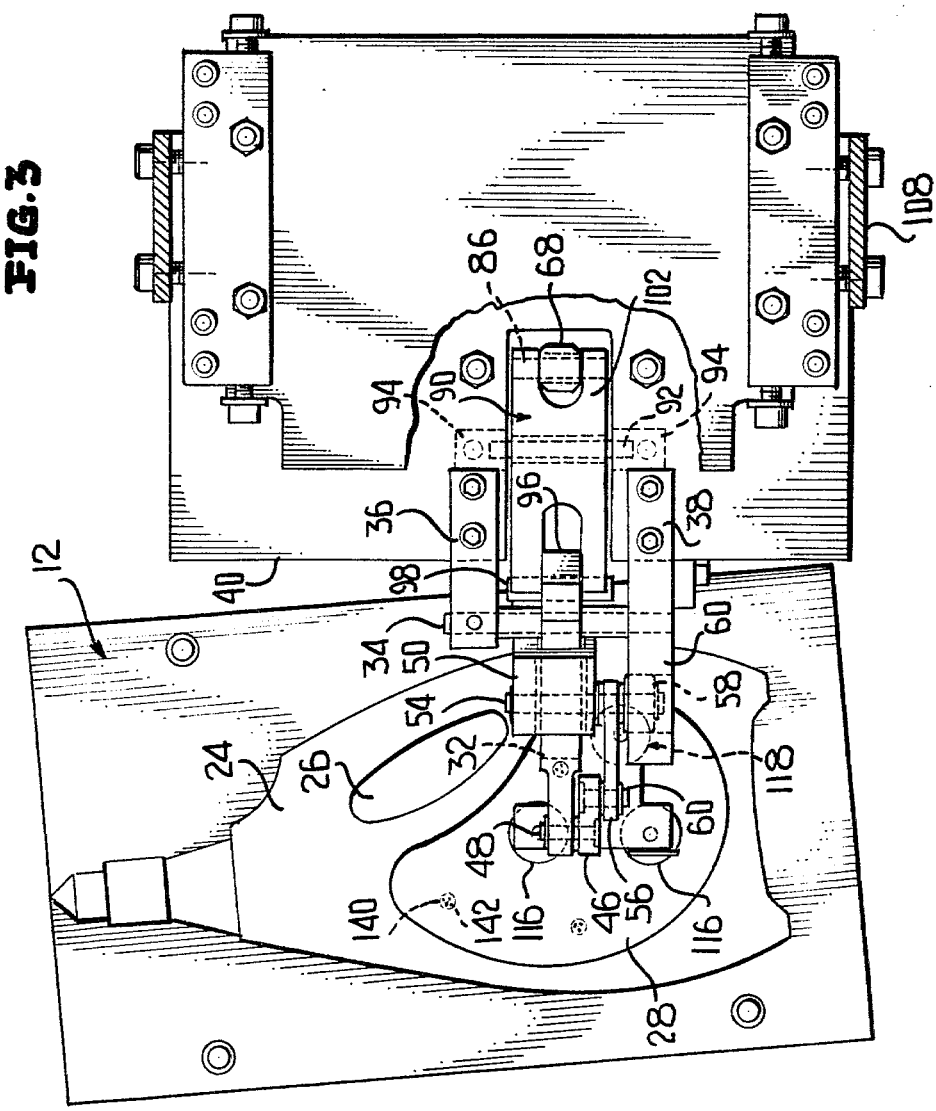

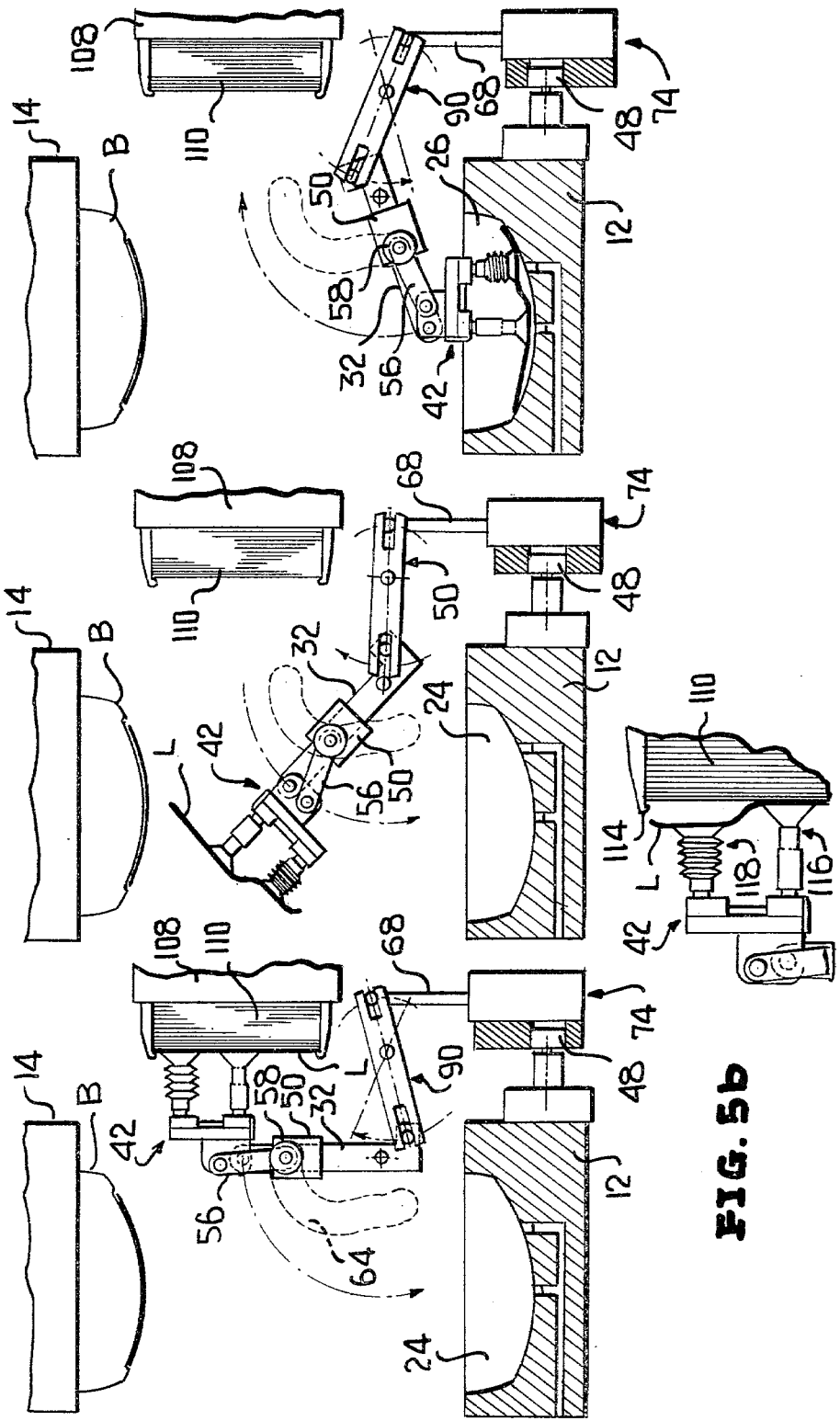

TRANSFER DEVICE FOR APPLYING LABELS TO BLOW MOLDS

This invention relates in general to new and useful improvements in the application of labels to containers, and most particularly to the application of labels to blow molded plastic material containers.

It has been found to be most expeditious to place the required paper and paper-like labels to blow molded containers at the time of the blow molding of the containers from preforms. This invention particularly relates to the placing of such labels within the blow mold cavities.

In accordance with this invention, labels are provided in stacks and a transfer device is provided for picking up a foremost label and moving the label into alignment with the preselected portion of a cavity of a moving blow mold half. In the preferred apparatus in accordance with this invention, the labels are generally positioned in a vertical plane while the blow mold cavity is generally in a horizontal plane, and because the label must be deposited within the cavity of a blow mold half, it is desirable that the label pass through an arc on the order of 270°.

In accordance with this invention, the label is carried by a transfer head which is pivotally mounted on the outer end of an arm which, in turn, is pivotally mounted for swinging movement. Drive means are provided for effecting the timed pivoting of the arm in response to the movement of a blow mold half past the transfer device, with there being actuating means operable in response to the pivoting of the arm to effect relative pivoting of the transfer head with respect to the arm so that the required movement of a label through an arc on the order of 270° may be effected with the pivoting of the arm being restricted to an arcuate extent on the order of 110°. In this way, the transfer head may be properly oriented for movement into the mold half cavity and depositing the label carried thereby closely adjacent to the wall of the blow mold half.

The pivoting of the arm is effected in timed relation to the moving blow mold half by suitable drive means actuated by the moving blow mold half.

In order to make certain that only one label is removed from the stack upon each operation of the transfer device, the transfer head is provided with suction cups with one of the suction cups being positioned adjacent an edge of the label and having means for automatically effecting withdrawal thereof so as to effect a peeling of the label from the stack beginning at an edge thereof, as opposed to a direct movement of the label in an endwise direction relative to the stack.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1 is a fragmentary schematic side elevational view of a blow molding machine having incorporated therein label applying mechanisms for separately applying labels to each of the blow mold cavities.

FIG. 3 is an enlarged fragmentary horizontal sectional view taken generally along the line 3—3 of FIG. 2, and shows further the details of the transfer device, parts being broken away and shown in section.

FIG. 4 is a fragmentary elevational view taken generally along the line 4—4 of FIG. 3, and shows the details of the drive means for effecting pivoting of the arm of the transfer device.

FIG. 5a is a schematic view showing the transfer device as it initially engages an endmost label.

FIG. 5b is a schematic view of the transfer head only, showing the manner in which a label is peeled from the stack.

FIG. 5c is a diagrammatic view of the transfer device in an intermediate position.

FIG. 5d is a diagrammatic view showing the transfer device in its label applying position.

Figure 2:
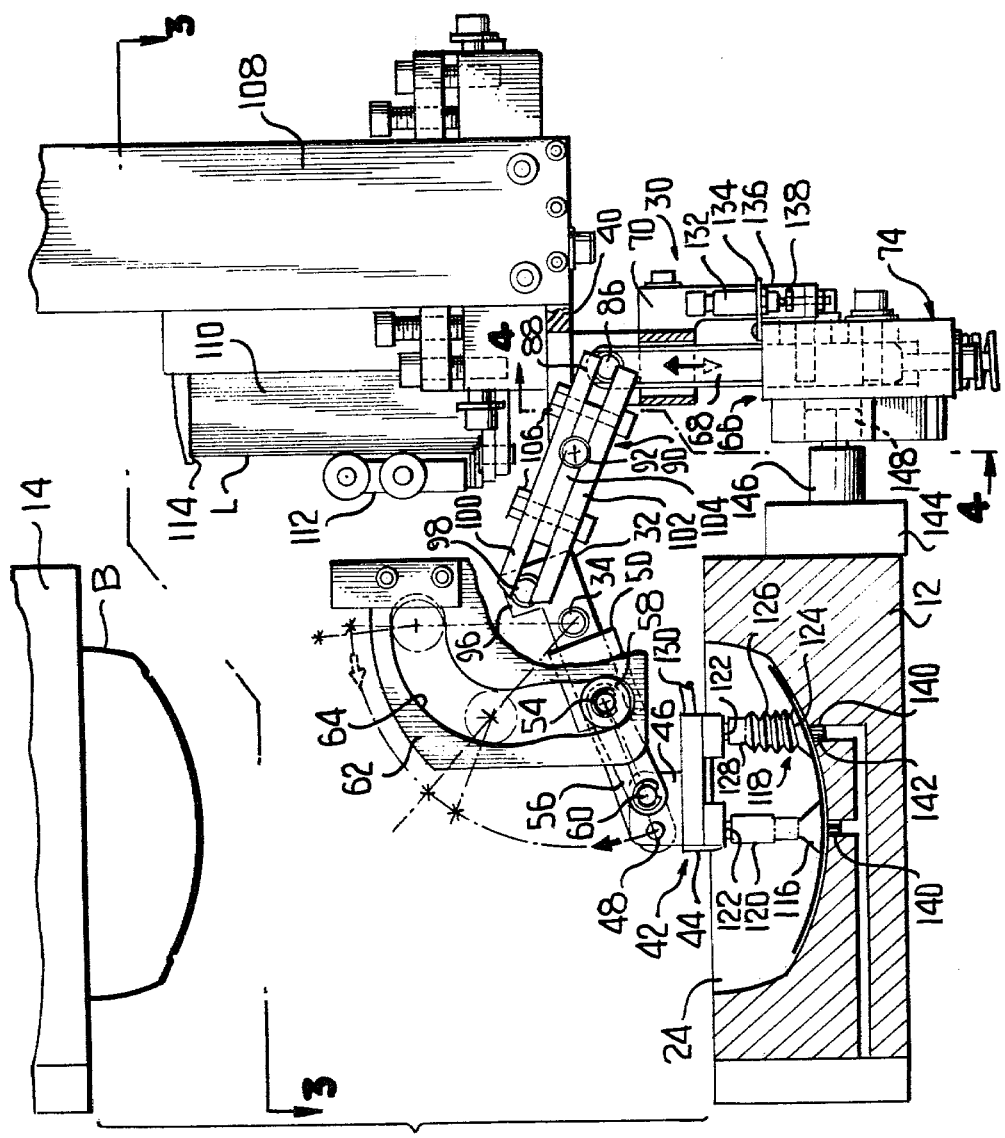
FIG. 2 is an enlarged elevational view showing the details of the transfer device and its relationship with respect to a label stack and an associated blow mold half.

Referring now to the drawings in detail, reference is first made to FIG. 1 wherein there is schematically illustrated a conventional blow molding machine of the well known wheel type. The blow molding machine, which is generally identified by the numeral 10, includes an inner set of mold halves 12 and an outer set of mold halves 14 suitably mounted for rotation in unison about a main shaft 15 of the wheel. In the conventional operation of the machine 10, as a set of mold halves 12, 14 approaches a vertical position, there is disposed between the mold halves an extruded plastics material tube 16 which is continuously extruded by a conventional extruder head 18. The set of mold halves 12, 14 clamp about the extruded tube and seal opposite ends of the tube.

In a conventional manner, gas, generally air, under pressure is directed into the sealed-off length of tube within the closed mold defined by the set of mold halves 12, 14 and the tube is blown to the configuration defined by the mold. This occurs while the machine is constantly rotating in a clockwise manner in the illustrated embodiment. After the molded article has had time to set, the mold halves begin to separate somewhere in the vicinity of the 9:00 o'clock position. The construction of the mold halves is such that the blown article, such as a bottle B, adheres to the outer mold half 14 as it moves radially outwardly away from the respective inner mold half 12. Generally, the blow molded article is discharged from the outer mold half 14 in the vicinity of the 12:00 o'clock position of the mold.

In accordance with this invention, prior to the mold halves closing about the extruded tube 16, suitable labels are placed in one or both mold halves. In the illustrated embodiment of the invention, a first label is placed in each inner mold half 12 by a label applicator generally identified by the numeral 20 at a time while the molded article or bottle B is still within the outer mold half 14. Thereafter, the bottle is discharged, followed by a second label applicator 22 functioning to place a suitable label in the outer mold half 14.

This invention relates to the label applicator, and most specifically to the transfer apparatus for transferring a label from a stack of labels into a respective blow mold cavity. Inasmuch as the label applicators 20, 22 are identical except for being inverted, only the details of the label applicator 20 will be set forth herein.

Reference is now made to FIG. 3 wherein a typical inner mold half 12 is illustrated. It will be seen that the mold half 12 has a cavity 24 particularly configurated to define a bottle B including a handle which, while it is an integral continuation of the remainder of the bottle, is separated from an adjacent portion of the bottle by an opening. This opening is defined by an upstanding boss 26 in the cavity 24. The configuration of the bottle B is such that adjacent the boss 26 there is a generally flat wall portion 28 of the cavity to which a label L is to be applied with the outline of the label corresponding generally to the configuration of the wall portion 28. The transfer apparatus, which is generally identified by the numeral 30, is best illustrated in FIGS. 2 and 3 and includes a main arm 32 which is pivotally mounted on a pivot pin 34, the pivot pin 34 being carried by supports 36, 38 which are mounted on a suitable mounting plate 40.

The arm 32 carries at its outer end a transfer head generally identified by the numeral 42. The transfer head 42 includes a support plate 44, which is generally T-shaped in outline. The support plate 44 has projecting upwardly therefrom, with reference to FIG. 2, a mounting block 46 which is pivotally connected to an outer end portion of the arm 32 by means of a pivot pin 48.

An intermediate portion of the arm 32 has slidably mounted thereon a slide member 50 which is preferably in the form of a block telescoped over the arm, as is apparent from FIGS. 2 and 3. The arm 32 has an elongated slot 52 extending therethrough, and the slide member 50 carries a pin 54 which extends through that slot. The pin 54, as is best shown in FIG. 3, projects beyond the slide member 50 to one side thereof and carries one end of a link 56. A cam follower 58 is mounted on the extreme end of the pin 54 adjacent the link 56. The link 56 has its upper end pivotally connected to the block 46 by way of a pivot pin 60.

There is a suitably mounted cam plate 62 which is vertically disposed and which has a generally L-shaped cam track 64 therein receiving the cam follower 58. Thus, when the arm 32 pivots from the illustrated position of FIG. 2 to a substantially vertical position, the sliding member 50 is moved outwardly on the arm 32 to effect the pivoting of the transfer head 42 around the end of the arm 32 so as properly to position the transfer head 42 for picking up a label in a manner to be described hereinafter.

The mechanism for effecting pivoting of the transfer head 42 about the arm 34 will be considered actuating means for descriptive purposes.

The transfer apparatus 30 also includes drive means generally identified by the numeral 66. The drive means 66 includes a drive member or shaft 68 which is mounted for vertical reciprocatory movement. Referring now to FIG. 4, it will be seen that the drive member 68 is slidably mounted in a fixed block 70 which carries a plurality of depending support pins 72. The support pins 72 have slidably mounted thereon a cam unit 74 including an outer cam member 76 and an inner cam member 78 defining therebetween a cam track 80. The lower end of the drive member 68 is adjustably secured to the cam unit 74 for reciprocatory vertical movement therewith.

Each of the guide rods or pins 72 carries a compression spring 82 which engages an adjustably mounted stop collar 84. The compression springs 82 bear against the bottom of the cam assembly 74 and constantly urge the cam assembly to an uppermost position which is the normal rest position of the cam assembly, which rest position will be described in more detail hereinafter.

The upper end of the drive member 68 carries a pivot pin 86 which has flattened ends engaged by a double bifurcated end 88 of a link 90 which is pivotally mounted on a pivot pin 92 which is, in turn, suitably mounted in support members 94 carried by the underside of the plate 40.

The arm 32 has an offset end 96 which also carries a pivot pin 98 having flattened ends, the flattened ends of the pivot pin 98 being engaged by a double bifurcated end 100 of the link 90.

For a better understanding, it is to be understood that the link 90 is formed of three plates, two outer plates 102 and a central spacer plate 104. The opposite ends of the outer plates 102, as best shown in FIG. 3, are bifurcated so as to provide suitable clearance at one end for the drive member 68 and at the opposite end of the offset end portion 96 of the arm 32. The spacer plate 104 is of a thickness in accordance with the dimensions of the flattened end portions of the pivot pins 86, 98 so that the pivot pins may be free to slide between the plates 102. Since the plate 104 is materially shorter than the plates 102, it will be seen that the link 90 is also bifurcated in side elevation. The plates 102, 104 are suitably secured together by bolts 106.

The plate 40 also carries a suitable hopper mechanism 108 which in and of itself forms no part of this invention except that it is to be understood that the hopper 108 will support a stack 110 of labels L with the labels in a vertical or substantially vertical position and the foremost label being constantly pressed against suitable stop components 112, 114 in a manner wherein a foremost label may be readily removed from the stack by the transfer head 42.

At this time, it is pointed out that the labels being substantially vertical and the bottom wall of the mold cavity 24 being substantially horizontal, it is necessary that the transfer head be rotated through an arc of 270° whereas the arm 32 moves through an arc of only on the order of 110°. It is therefore necessary for the actuator means to rotate the transfer head 42 about the end of the arm 32 through an arcuate path having an extent on the order of 160°.

The transfer head 42, in a preferred embodiment of the invention, is provided with three suction heads or cups which include two fixed suction heads 116 which are intended to engage the central portion of a label and a displaceable suction head 118 which is positioned for engaging a label adjacent a peripheral edge thereof. With particular reference to FIG. 2, it will be seen that the suction cups 116 have stem portions 120 which are telescoped over tubular supports 122 which project from the plate 44.

It will be seen that the movable suction or vacuum head 118 includes an outer cup portion 124 which is carried by a bellows 126 which, in turn, is carried by a sleeve portion 128 which is telescoped over another of the tubes 122. It thus will be seen that the cup portion 124 is subject to displacement axially of the tube 122 toward the plate 44 when the suction cup 124 is in sealed engagement with a label.

The plate 44 has suitably coupled thereto a flexible line 130 which is in communication with the interior of the tubes 122 for selectively presenting a vacuum or directing air under pressure to the vacuum heads 116, 118. The line 130 is coupled to a control valve (not shown) which is in communication with both a vacuum source and a fluid pressure source. The control valve is positioned by a control unit 132 which is carried by a plate 134 suitably mounted on the cam assembly 74, as is best shown in FIG. 2. The plate or block 70 has a depending portion 136 which carries an adjustable stop member 138 which is engaged by the control member 132 for changing the flow through the line 130 from a vacuum to a pressurized flow.

At this time, it is pointed out that the mold half 112 has a series of plugs 140 disposed in flush relation with the wall of the cavity 24 and each of these plugs is provided with very narrow slits 142 which are in communication with a vacuum source so as to hold a label in place in the mold cavity once the label has been deposited therein.

Referring once again to FIG. 2, it will be seen that the mold half 12 is provided with a mounting plate 144 which, in turn, carries a shaft 146 on which there is mounted a cam follower 148. The cam follower 148, as is schematically shown in FIG. 4, engages between the cams 76, 78 and the cam track 80 so as to effect vertical movement of the cam assembly 74 and the drive member 68.

Although the transfer head 42 has been illustrated in its position depositing a label L in the mold cavity 24, it is to be understood that this is the operative position of the transfer device 30 and that the normal rest position of the transfer device is one wherein the arm 32 is substantially vertically disposed and the transfer head 42 is facing the stack 110 of labels L. The compression springs 82 are so adjusted as to position the transfer head 42 with the vacuum heads 116 lightly engaging the foremost label L in the stack 110. In order to assure the full engagement of the vacuum heads 116, 118 with the foremost label at a preselected pressure, the cam member 76 is provided with a spring loaded pin 150 which projects into the cam track 80. This pin, when engaged by the cam follower 148, causes an upward movement of the cam assembly 74 and the drive member 68 above that which is the normal position effected by the springs 82. As the cam follower 148 rides over the projecting head of the pin 150, the transfer head 42 is momentarily moved toward the stack of labels so that the vacuum heads 116, 118 engage the foremost label under pressure, thereby assuring the seating of these heads on the foremost label L with the label closing the vacuum heads and being thus gripped by the vacuum heads.

After the cam follower 148 rides off of the pin 150, the transfer head 42 moves slightly away from the label stack to a position wherein the foremost label is still at the end of the label stack, as is clearly shown in FIG. 2. However, because the vacuum head 118 includes the bellows 126, when the end of its cup portion 124 is sealed, the bellows 126 collapses and withdraws that portion of the label away from the remainder of the stack in a peeling manner as is clearly shown in phantom lines in FIG. 2. In this manner, the transfer of but a single label is assured.

It is to be understood that the cam follower 148 is so positioned on the mold half 12 that when the transfer head 42 reaches the position illustrated in FIGS. 2 and 3, the moving mold half 12 is aligned with the label being transferred thereto. It is also to be understood that the transfer head does not directly place the label in the mold cavity, but that shortly before the label engages the wall of the mold cavity 24, the vacuum is removed and air under pressure is directed into the vacuum heads 116, 118 to blow the label into place.

Although the operation of the invention has been described, reference is now made to FIGS. 5a–5d where a better understanding of the operation of the transfer apparatus may be had. It will be seen that in FIG. 5a the transfer head 42 is positioned so that the vacuum heads 116, 118 are engaged with the foremost label L, but the label is still in its position at the front of the stack 110. Then, as the vacuum within the heads 116, 118 becomes operative and the head 118 moves away from the stack, there is a distortion of the label from the stack starting at that edge of the label adjacent the head 118. This is the rest position of the transfer head 42 with a label carried thereby ready for transfer to the next following mold cavity.

When the cam follower 148 engages within the cam track 80, the arm 32 is swung in a counterclockwise direction and the transfer head 42 begins to swing about the end of the arm 32 also in a counterclockwise direction. An intermediate position of the arm 32 and the transfer head 42 is shown in FIG. 5c.

Pivoting of the arm 32 about the pivot 34 and pivoting of the transfer head 42 about the arm 32 continues until the arm 32 reaches the end of its travel and the transfer head 42 is disposed within the mold cavity 24 ready to direct the label against the underlying wall of the mold cavity. This position of the transfer device is shown in FIG. 5d.

It will be seen that because the transfer head 42 is rotating about the end of the arm 32, the vacuum heads 116, 118 and the label L carried thereby are rapidly moved into the cavity 24 at the last moment clearing the projection 26. Further, because of the immediate reversal of the movement of the arm 32 and the transfer head 42 about the end of the arm 32, the vacuum heads 116, 118 are rapidly pulled out of the mold cavity to clear the end wall of the mold cavity.

It is to be understood that a main feature of the transfer apparatus 30 is that it can function accurately to position a label in the mold cavity without in any way interfering with the operation of the molding machine 10. The molding machine 10 operates in its normal manner at its normal speed.

Although only a preferred embodiment of the transfer apparatus has been specifically illustrated and described herein, it is to be understood that minor variations may be made therein without departing from the spirit and scope of the invention as defined by the appended claims.

I claim:

1. A transfer device for transferring a label or like sheet from a stack to a moving member, said transfer device comprising a pivotally mounted arm, a transfer head pivotally mounted on said arm remote from its pivot and for pivoting with said arm and relative to said arm, said transfer head having transfer means for picking up and discharging labels and like sheets, return means coupled to said arm for positioning said arm and said transfer head with said transfer head being disposed adjacent said stack of sheets, drive means coupled to said arm for overcoming said return means and pivoting said arm and said return means in a selected direction to a position to deposit a transferred sheet on said moving member in response to movement of said moving member relative to said transfer device, and actuator means for pivoting said transfer head relative to said arm in said selected direction in response to pivoting of said arm whereby the total pivoting of said transfer head is greatly in excess of the pivoting of said arm.

2. A transfer device according to claim 1 wherein said actuator means includes a slide member on said arm, a link extending between said slide member and said transfer head, and a cam and cam follower for effecting controlled sliding of said slide member on said arm in response to pivoting of said arm.

3. A transfer device according to claim 2 wherein said cam is fixed and said cam follower is carried by said slide member.

4. A transfer device according to claim 3 wherein said cam follower is carried by a pin extending through a slot in said arm and serving as means retaining said slide member on said arm.

5. A transfer device according to claim 4 wherein said pin also forms a pivot for said link.

6. A transfer device according to claim 1 wherein said drive means includes a drive member, a link connecting said drive member to said arm, and a movable cam connected to said drive member for effecting reciprocation of said drive member.

7. A transfer device according to claim 6 wherein said link is pivotally mounted for pivoting about a fixed axis and has sliding connections with said arm and said drive member.

8. A transfer device according to claim 6 wherein said return means includes said cam being spring urged to a normal position, and said cam having an exit portion with a projection for effecting momentary movement of said transfer head towards a stack beyond the normal position of said transfer means relative to a stack.

9. A transfer device according to claim 6 wherein said transfer head includes suction heads for engaging and holding a sheet to be transferred, suction means and pressure means for coupling to said suction heads to selectively hold a sheet and discharge a sheet, and control means for said suction means and said pressure means coupled to said drive member for actuation in accordance with the position of said drive member.

10. A transfer device according to claim 1 wherein said transfer device is part of a rotary blow molding machine having a horizontal axis of rotation and wherein blow mold halves of said machine are separated in a radial direction, the moving member is at least one of said blow mold halves, said blow mold halves have recessed cavities, and said transfer head is movable into a cavity of a respective moving blow mold half to deposit a label.

11. A transfer device according to claim 1 wherein the stacked position of a sheet is angularly remote from its intended position on a moving member on the order of 270°, said arm pivots through an arc on the order of 110°, and said transfer head pivots relative to said arm through an arc on the order of 160°.

* * * * *